(12) United States Patent
Aronson

(10) Patent No.: US 6,330,092 B1
(45) Date of Patent: Dec. 11, 2001

(54) POLARIZATION BASED DIFFERENTIAL RECEIVER FOR REDUCTION OF BACKGROUND IN FREE-SPACE OPTICAL LINKS

(75) Inventor: Lewis B. Aronson, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/075,308

(22) Filed: May 8, 1998

(51) Int. Cl.$^7$ .......................... H04B 10/00; H04B 10/04; H04B 10/06; H04B 10/10
(52) U.S. Cl. .......................... 359/156; 359/181; 359/180; 359/154
(58) Field of Search .................................... 359/161, 193, 359/156, 180, 181, 172

(56) References Cited

U.S. PATENT DOCUMENTS

| | | | |
|---|---|---|---|
| 5,530,577 | * 6/1996 | Orino | 359/152 |
| 5,608,560 | * 3/1997 | Abram | 359/156 |
| 5,742,418 | * 4/1998 | Mizutani | 359/156 |
| 5,777,768 | * 7/1998 | Korevaar | 359/172 |
| 5,896,216 | * 4/1999 | Kikushima | 359/182 |
| 6,057,003 | * 5/2000 | Dulaney | 427/457 |

* cited by examiner

Primary Examiner—Leslie Pascal
Assistant Examiner—Agustin Bello

(57) ABSTRACT

An optical link includes a transmitter and a receiver for sending and receiving data across a free-space link or any other link in which a high level of background light may be present. The transmitter includes a source of circularly polarized light having a predetermined wavelength. The source is modulated to transmit data. The receiver includes a circuit for generating a signal indicative of the difference in intensity of left-handed circularly polarized light and right-handed circularly polarized light incident on the receiver. In one embodiment of the invention, the receiver includes a first polarization filter for blocking left-handed circularly polarized light of the predetermined wavelength and a second polarization filter for blocking right-handed circularly polarized light of the predetermined wavelength, the filters being displaced from one another. A first detector measures the intensity of light leaving the first polarization filter, and a second detector measures the intensity of light leaving the second polarization filter. The circularly polarized light source may be generated from a linearly polarized light source by passing the linearly polarized light through a ¼ waveplate. Similarly, a polarization filter for blocking light of a predetermined circular polarization may be constructed by passing the light through a ¼ waveplate and a linear polarization filter. In one embodiment of the present invention, the transmitter modulates the source of circularly polarized light by changing the direction of polarization of the source of circularly polarized light.

19 Claims, 2 Drawing Sheets

POLARIZATION BASED DIFFERENTIAL RECEIVER FOR REDUCTION OF BACKGROUND IN FREE-SPACE OPTICAL LINKS

FIELD OF THE INVENTION

The present invention relates to communication links based on optical signaling, and more particularly, to an improved free space optical link having reduced background noise.

BACKGROUND OF THE INVENTION

For the purposes of the present discussion, a free space optical link is defined to be any transmission path in which data is communicated by modulating a light beam that travels through space to a detector. Free space optical links are being using with increasing frequency for the transmission of data. For example, infra-red optical ports for communicating data from a portable computer to a docking station or other computer are well known in the art. This type of link is also used in remote control units for operating television sets, VCR's, and the like.

The light entering the photodetector is the sum of the ambient background light and the modulated light beam from the transmitter. The most common background light sources are sunlight or fluorescent lighting. These background sources contribute a significant DC photocurrent to the output of the detector. Additionally, some background sources may contribute signals within the frequency range of the transmitted signal.

Detected DC background signals can cause problems in two ways. First, there is a type of noise known as shot noise which is proportional to the square root of the detected power. If the DC background signal is much larger than the data signal of interest, the shot noise from the DC background can become the dominant noise source and thus limit the minimum detectable signal power. Since the total shot noise power is related to the detection bandwidth, the problem becomes more significant at higher data rates. Furthermore, since DC background signals are often much larger than the data signal, the saturation level of a receiver with a DC coupled front end (such as a trans-impedance amplifier) must be designed to accommodate them. Because of the finite dynamic range of a receiver, this in turn can limit minimum detectable signal power.

As the data rate that these links are required to accommodate increases, problems caused by background light sources become more significant. As the bit rate increases, the power per bit decreases unless the intensity of the light source that is modulated in the transmitter can be increased. The decreased power per bit leads to an increase in the error rate unless the background light is also reduced.

There is a limit on the light intensity that can be utilized to transmit data. The transmitters of choice are lasers. Hence, the need to prevent eye damage in the event a transmitter is inadvertently aimed at the eye limits the maximum power of the light source. Accordingly, any improvements in signal to noise ratio must come from reducing the noise or increasing the dynamic range.

Two approaches have been suggested to reduce the errors caused by the background light. The first approach is based on the assumption that the background light intensity is constant in time. This approach utilizes front-end circuitry at the detector to subtract off any DC photocurrent from the front-end amplifier. A detector with capacitive coupling to the receiver circuit will also address this problem, but is rarely used since DC coupled front end circuits, such as a trans-impedance amplifier, generally provide much higher performance. This approach fails in situations in which the background light has high frequency components within the frequency band of the data signal. For example, background light from video displays may vary rapidly in time depending on the scene being displayed. Additionally, some forms of fluorescent lighting generate high frequency optical signals.

The second method utilizes the wavelength of the transmitter signal to distinguish the background light from the carrier light signal. This approach reduces the background noise by utilizing inexpensive wavelength filters made from photographic film to remove the portion of the background light that is outside the frequency band of the transmitter. However, the bandpass of the wavelength filter must still be large compared to the bandwidth of a laser to assure an economical filter design. Hence, systems based on wavelength filters are still subject to significant background light interference from sources that emit within the pass band of the filter.

Broadly, it is the object of the present invention to provide an improved optical transmission system.

It is a further object of the present invention to provide an optical transmission system, which is more resistant to background light than prior art systems.

These and other objects of the present invention will become apparent to those skilled in the art from the following detailed description of the invention and the accompanying drawings.

SUMMARY OF THE INVENTION

The present invention is an optical link that includes a transmitter and a receiver for sending and receiving data across a free-space link or any other link in which a high level of background light may be present. The transmitter includes a source of circularly polarized light having a predetermined wavelength. The source is modulated to transmit data. The receiver includes a circuit for generating a signal indicative of the difference in intensity of left-handed circularly polarized light and right-handed circularly polarized light incident on the receiver. In one embodiment of the invention, the receiver includes a first polarization filter for blocking left-handed circularly polarized light of the predetermined wavelength and a second polarization filter for blocking right-handed circularly polarized light of the predetermined wavelength, the filters being displaced from one another. A first detector measures the intensity of light leaving the first polarization filter, and a second detector measures the intensity of light leaving the second polarization filter. The circularly polarized light source may be generated from a linearly polarized light source by passing the linearly polarized light through a ¼ waveplate. Similarly, a polarization filter for blocking light of a predetermined circular polarization may be constructed by passing the light through a ¼ waveplate and a linear polarization filter. In one embodiment of the present invention, the transmitter modulates the source of circularly polarized light by changing the handedness of the polarization of the source of circularly polarized light.

DETAILED DESCRIPTION OF THE PREFERRED EMBODIMENTS OF THE PRESENT INVENTION

The present invention is based on the observation that most background sources are unpolarized. Direct incidence sunlight and incandescent or fluorescent lighting are known to be unpolarized. Furthermore, most sources of polarized light generate linearly polarized light.

Figure 1:
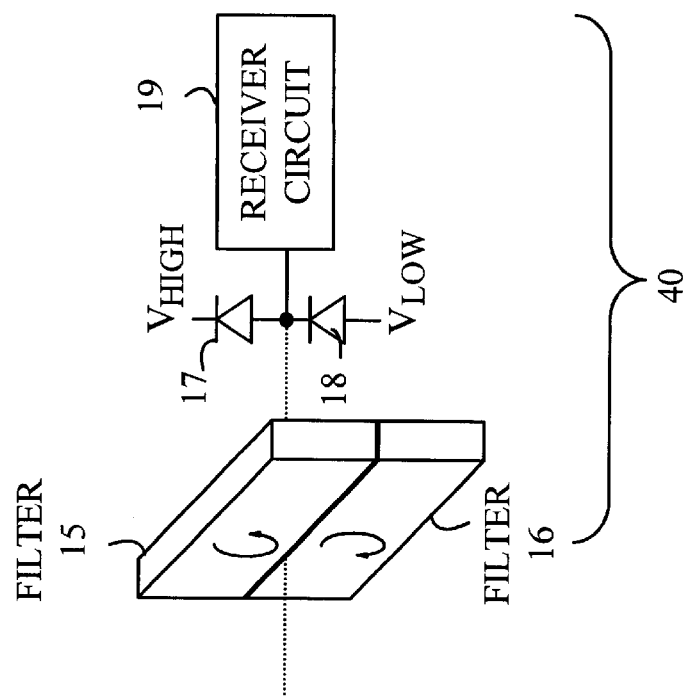
FIG. 1 is a block diagram of one embodiment of a transmitter-receiver pair according to the present invention.
Figure 1:
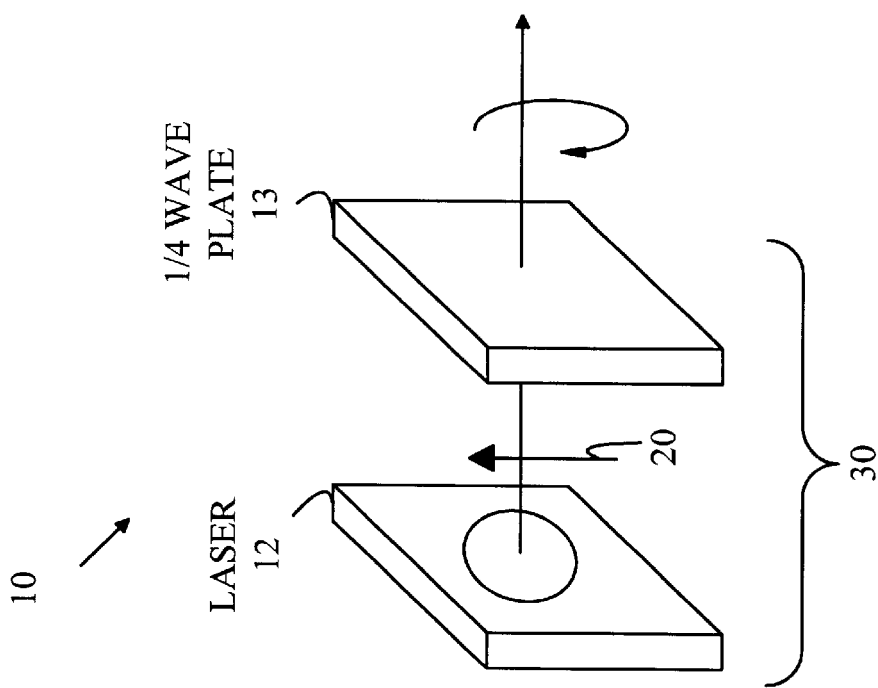

Accordingly, if the transmitter optical source, which typically is based on a semiconductor laser or light emitting diode, is circularly polarized, the background light can be differentiated from the signal using polarization filters. Refer now to FIG. 1, which is a block diagram of one embodiment of a transmitter-receiver pair 10 according to the present invention. The transmitter 30 modulates a laser. The laser generates a linearly polarized output beam as indicated by arrow 20. The linearly polarized output of laser 12 is then converted to a circularly polarized beam by quarter wave plate 13. The receiver 40 includes a pair of circular polarization filters 15 and 16 displaced with respect to one another. Filter 15 passes light of the circular polarization generated by transmitter 30. Filter 16 passes circularly polarized light having a polarization opposite to that generated by transmitter 30. The light received through filter 15 is imaged onto photodiode 17, and the light received through filter 16 is imaged onto photodiode 18. Photodetectors 17 and 18 are connected in series such that the photocurrent which is input to the receiver circuit is equal to the difference of the light signals received through the two polarization filters. For the purposes of this discussion we will refer to this detector arrangement as a differential detector pair. In FIG. 1, the photodiodes are shown connected to bias voltages $V_{high}$ and $V_{low}$. Generally, the only requirements on these voltages are that they result in sufficient bias across the photodiodes. Thus, the voltage difference between $V_{high}$ and the voltage at the receiver circuit input must be greater than the minimum bias required by photodiode 17 and less than its breakdown voltage. A similar relationship exists between the receiver circuit input voltage, $V_{low}$ and the requirements of photodiode 18.

Since the background light is unpolarized or linearly polarized, it may be viewed as being the sum of two circular light sources of equal intensity and opposite circular polarizations. Accordingly, the output of the differential detector pair will be independent of the background light intensity, since the background component received through filter 15 will be identical to the component received through filter 16. However, any light from transmitter 30 that strikes filter 16 will be blocked by that filter. Hence, the receiver electronics receives a signal whose amplitude is equal to the intensity of the light from transmitter 30 that passes through filter 15 independent of the background illumination.

As noted above, the preferred polarization for the transmitter is circular. In principle, one could construct a system based on elliptical or linearly polarized light. In the case of a linearly polarized system, the polarization filters in the receiver would be set to accept the two possible orthogonal light components. Circular polarization has two distinct advantages over linear or elliptical sources. First, there is no preferred orientation in a system based on a circularly polarized source. Hence, the output of the receiver is independent of the angular relationship between the transmitter and receiver. That is, the transmitter source may be rotated around the optical path axis without affecting the received power. A linearly polarized source, in contrast, could not be detected if the transmitter (say a laptop computer) were rotated by 45° around the optical axis relative to the receiver. Second, there are numerous linearly polarized background sources, such as sunlight glinting off of a flat surface, but few circularly polarized background sources.

As noted above, a circularly polarized light source can be generated from a linearly polarized light source by passing the light source through a ¼ wave plate, sometimes referred to as a"retarder". This is simply a birefringent material where the thickness is chosen such that there is a phase retardation of $\pi/2$ between the fast and slow polarizations. If the light source's polarization axis is aligned to 45° between the slow and fast axis of the waveplate, left-hand circular light emerges. If the angle is −45°, the output is right-hand circular. It should be noted that plastic waveplates are used in such applications, such as display glare shields, which are very inexpensive. The thickness of these materials has to be chosen properly for a particular wavelength; however, it should be noted that a small error will only result in slightly elliptical polarization which in turn would result in only a small reduction in the amplitude of the received signal. As noted above, the preferred receiver comprises two detectors connected in series with a connection to the common point. Metal semiconductor photodiode detectors (C. W. Slayman and L. Figueroa, "Frequency and pulse response of a novel high speed interdigital surface photoconductor", IEEE Electron Device Lett., vol. EDL-2, pp. 112–114, 1981.) are well suited for this application since all of the connections are on the top surface and either terminal can be the positive or negative. The detectors should have equal area, which is easy to assure lithographically. In the preferred embodiment of the present invention, each detector is covered by the opposite type circular polarizer. A circular polarizer may be formed by a ¼ waveplate, which will convert linear to circular polarization, followed by a suitably aligned linear polarizer which will block light generated by the unwanted circular polarization. As noted above, inexpensive plastic circular polarizers are readily available in sheet form, as they are used in glare shields.

The optical system must be designed such that both detectors are equally illuminated by all background light sources. This requires that the background light hit both detectors equally independent of the direction of the incoming background light and independent on the portion of the input aperture which is illuminated. If unequal amounts of the unpolarized background light hits each detector, less than perfect cancellation will be obtained. If this situation arises, a diffuser can be used to ensure equal flux on both polarizer/detectors.

It should be noted that the circular polarization filters in the receiver need only work at the wavelength of the light transmitted by the transmitter if the background sources are unpolarized, which is the most common case. As noted above, any given ¼ waveplate only functions perfectly at wavelengths such that the phase difference between the polarizations is $n\pi/2$ with respect to the design wavelength. Here, n is an integer and the design wavelength is chosen to be the same as the signal wavelength from the transmitter. As the wavelength of light entering the waveplate moves away from the design wavelength, the polarizer efficiency decreases. At half the design wavelength, a ¼ waveplate will behave as a ½ waveplate, and the overall circular polarizer will act as a linear polarizer. However, this degradation only affects the reception of background light. If the background light is unpolarized the two detectors will still receive equal amounts, and the background photocurrent will not enter the receiver.

Background light having linear polarization occurs in nature. For example, sunlight reflecting off of surfaces at shallow angles generates linearly polarized light. However, linearly polarized background light will not contribute to the photocurrent output of the detector because it is made up of equal amounts of right-hand and left-hand circularly polarized light. Hence, the wavelengths at which the circular polarization filters operate correctly, i.e., near the signal wavelength, this background is effectively eliminated. If linearly polarized background sources are present at significantly different wavelengths, the polarization filters in the preferred embodiment of the present invention can be modified by adding a coarse wavelength filter, which effectively eliminates that background light.

As noted above, background light having circular polarization is not observed often in nature at intensities that could give rise to a significant background signal. Hence, the present invention provides an effective solution to the background light problem in free space transmission links.

The embodiment of the present invention shown in FIG. 1 generates a photocurrent into the receiver that varies from 0 to some peak value $I_{sigal}$. This embodiment also requires the polarization filter shown in the transmitter to generate light that passes through polarization filter 15 in the receiver. Hence, the transmitter and receiver must be "matched". That is, a receiver designed for right-handed polarized signals would receive inverted data from a transmitter sending left-handed polarized signals. In addition, the receiver has an average photocurrent that is greater than 0 even in the absence of any background noise.

Figure 2:
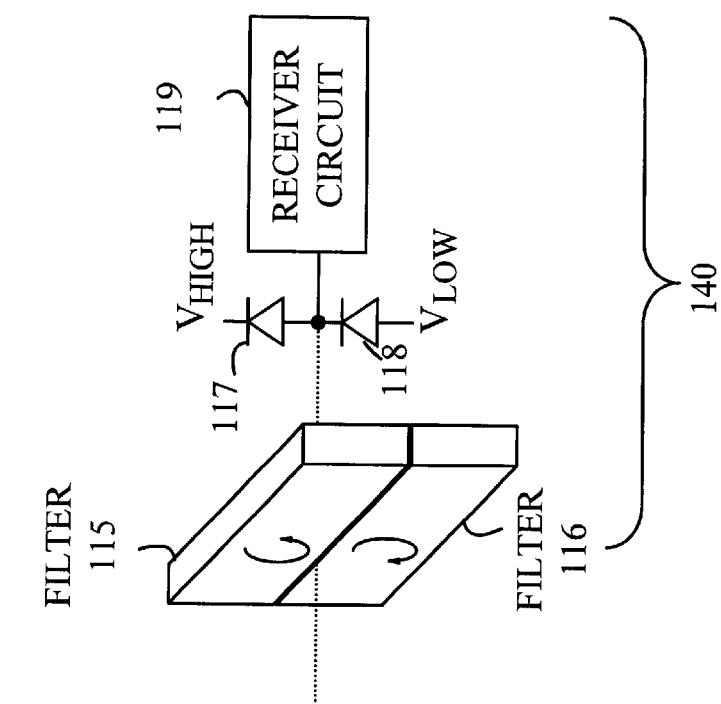
FIG. 2 is a block diagram of another embodiment of a transmitter-receiver pair according to the present invention.
Figure 2:
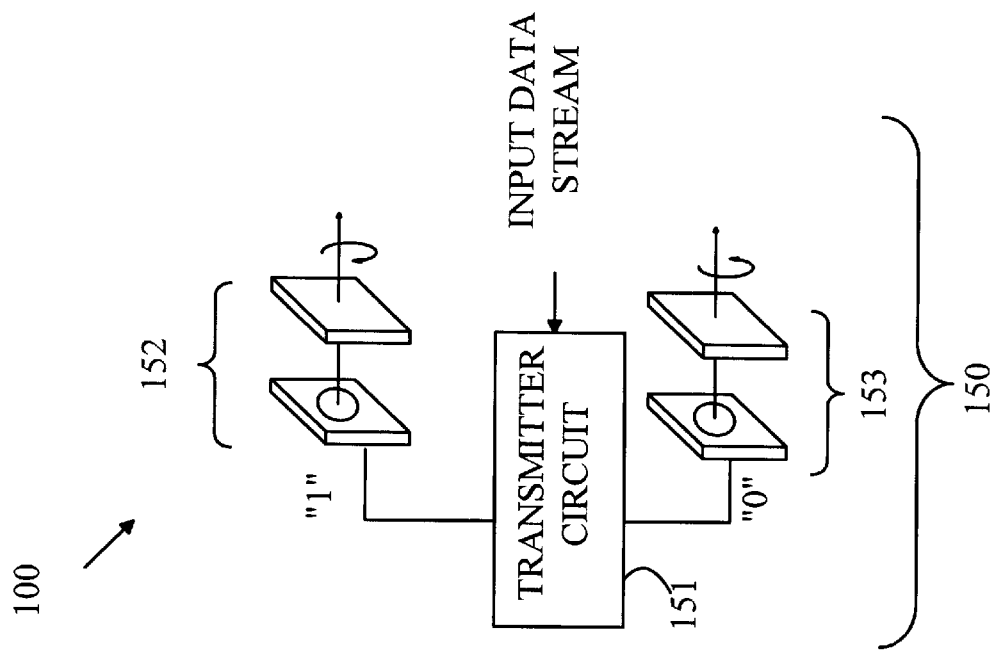

Refer now to FIG. 2, which is a block diagram of a transmitter-receiver pair 100 according to another embodiment of the present invention. The transmitter now includes two laser/polarization filter pairs. Pair 152 generates light that is left-handed, and pair 153 generates light that is right-handed. A transmitter circuit 151 separates the binary data stream into 1s and 0s. The 1s are sent via pair 152 and the 0s via pair 153. In this embodiment, data is transmitted by modulating the direction of polarization of the circularly polarized light source instead of modulating the intensity of the source.

The signal input to receiver circuit 119 now swings between $-I_{signal}$ and $I_{signal}$ and has an average of 0 provided there are equal numbers of 1s and 0s in the transmitted data. Moreover, the quantizer circuit, which is usually part of the receiver and converts the analog input into digital output levels, can use this zero input value as a convenient threshold level for discriminating between 0's and 1's.

The above embodiments of the present invention have utilized a laser as the source of linearly polarized light. However, it will be obvious to those skilled in the art from the preceding discussion that any source that generates linearly polarized light could be utilized without deviating from the teachings of the present invention. For example, a light-emitting diode followed by a linear polarizer could be utilized as the linearly polarized light source. Furthermore, any source which can somehow generate circularly polarized light directly could easily be substituted for the combination of a linear source and circular polarizer.

In addition, it should be noted that certain large organic molecules, referred to as "chiral" compounds preferentially absorb light of one circular polarization. DNA molecules are examples of such compounds. Hence, a circularly polarized source of light could be generated, in principle, by light from a source having both left-handed and right-handed components through a filter constructed from a chiral compound. Similarly, the circular polarization filters discussed above could, in principle, be constructed from such compounds.

Various modifications to the present invention will become apparent to those skilled in the art from the foregoing description and accompanying drawings. Accordingly, the present invention is to be limited solely by the scope of the following claims.

What is claimed is:

1. An optical link comprising a transmitter and a receiver, said transmitter comprising a source of circularly polarized light having a predetermined wavelength, said source being modulated to transmit data; and
said receiver comprising a circuit for generating a signal indicative of the difference in intensity of left-handed circularly polarized light and right-handed circularly polarized light incident on said receiver.

2. The optical link of claim 1 wherein said transmitter comprises a source of linearly polarized light and a ¼ waveplate.

3. The optical link of claim 2 wherein said source of linearly polarized light comprises a light-emitting diode.

4. The optical link of claim 3 wherein said source of linearly polarized light further comprises a linear polarizer.

5. The optical link of claim 2 wherein said source of linearly polarized light comprises a laser.

6. The optical link of claim 1 wherein said receiver comprises a first polarization filter for blocking left-handed circularly polarized light of said predetermined wavelength and a second polarization filter for blocking right-handed circularly polarized light of said predetermined wavelength, said filters being displaced from one another.

7. The optical link of claim 6 wherein said receiver further comprises a first detector for measuring the intensity of light leaving said first polarization filter and a second detector for measuring the intensity of light leaving said second polarization filter.

8. The optical link of claim 7 wherein said receiver includes a circuit having an input terminal, wherein said detectors of said receiver are current generating devices and wherein said detectors are connected in series such that said input terminal is connected to the junction between said two detectors.

9. The optical link of claim 6 wherein said first polarization filter and said second polarization filter further comprise a wavelength filter for blocking light having a wavelength outside a band including said predetermined wavelength.

10. The optical link of claim 1 wherein said transmitter modulates said source of circularly polarized light by changing the direction of polarization of said source of circularly polarized light.

11. The optical link of claim 10 wherein said transmitter comprises first and second sources of circularly polarized light, said first source having an opposite polarization direction from said second source, and wherein said transmitter encodes data as bits having values of 0 or 1 and wherein data bits having said value of 1 are sent via said first source and bits having said value of 0 are sent via said second source.

12. A transmitter comprising:
a circuit for receiving an input data stream; and
a light source for generating a circularly polarized light signal, said light signal being modulated in response to said input data stream, wherein said transmitter modulates said source of circularly polarized light by changing the direction of polarization of said source of circularly polarized light.

13. The transmitter of claim 12 wherein said transmitter comprises first and second sources of circularly polarized light, said first source having an opposite polarization direction from said second source, and wherein said transmitter encodes data as bits having values of 0 or 1 and wherein data bits having said value of one are sent via said first source and bits having said value of 1 are sent via said second source.

14. The transmitter of claim 12 wherein said light source comprises a source of linearly polarized light and a ¼ waveplate.

15. A receiver comprising:

a port for receiving a light signal; and a circuit for generating a signal indicative of the difference in intensity of left-handed circularly polarized light and right-handed circularly polarized light incident on said port.

16. The receiver of claim 15 further comprising a first polarization filter for blocking left-handed circularly polarized light of a predetermined wavelength and a second polarization filter for blocking right-handed circularly polarized light of said predetermined wavelength, said filters being displaced from one another.

17. The receiver of claim 16 further comprising a first detector for measuring the intensity of light leaving said first polarization filter and a second detector for measuring the intensity of light leaving said second polarization filter.

18. The receiver of claim 17 wherein said receiver includes a circuit having an input terminal, wherein said detectors are current generating devices and wherein said detectors are connected in series such that said input terminal is connected to the junction between said two detectors.

19. The receiver of claim 17 wherein said first polarization filter and said second polarization filter further comprise a wavelength filter for blocking light having a wavelength outside a band including said predetermined wavelength.

\* \* \* \* \*